United States Patent
Shah et al.

(10) Patent No.: US 7,039,922 B1
(45) Date of Patent: May 2, 2006

(54) CLUSTER WITH MULTIPLE PATHS BETWEEN HOSTS AND I/O CONTROLLERS

(75) Inventors: Rajesh R. Shah, Beaverton, OR (US); Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/450,381

(22) Filed: Nov. 29, 1999

(51) Int. Cl.
*G06F 9/00* (2006.01)

(52) U.S. Cl. .......................... 719/326; 719/325; 710/1

(58) Field of Classification Search ............ 710/1–244; 707/1–200, 201–206; 714/1–57, 100; 719/321–328
See application file for complete search history.

(56) References Cited

U.S. PATENT DOCUMENTS

| | | | |
|---|---|---|---|
| 5,644,712 A * | 7/1997 | Coscarella et al. ............ | 710/9 |
| 6,148,349 A * | 11/2000 | Chow et al. ................... | 710/33 |
| 6,151,684 A * | 11/2000 | Alexander et al. ............. | 714/4 |
| 6,209,023 B1 * | 3/2001 | Dimitroff et al. ........... | 709/211 |
| 6,341,356 B1 * | 1/2002 | Johnson et al. ................ | 714/4 |
| 6,434,656 B1 * | 8/2002 | Downer et al. ............. | 710/316 |
| 6,470,397 B1 * | 10/2002 | Shah et al. .................. | 709/250 |
| 6,587,950 B1 | 7/2003 | Shah et al. | |
| 6,591,309 B1 | 7/2003 | Shah | |
| 6,594,698 B1 * | 7/2003 | Chow et al. ................. | 709/226 |
| 6,694,361 B1 | 2/2004 | Shah et al. | |
| 6,725,386 B1 | 4/2004 | Shah | |
| 6,738,818 B1 | 5/2004 | Shah et al. | |
| 6,757,242 B1 | 6/2004 | Wang et al. | |
| 6,766,470 B1 | 7/2004 | Shah | |
| 6,772,320 B1 | 8/2004 | Raj | |
| 6,810,418 B1 | 10/2004 | Shah et al. | |
| 2002/0133633 A1 | 9/2002 | Arvind | |
| 2003/0061367 A1 | 3/2003 | Shah | |
| 2003/0065775 A1 | 4/2003 | Aggarwal | |
| 2003/0103455 A1 | 6/2003 | Pinto | |

OTHER PUBLICATIONS

Next Generation I/O Architecture Specification: Channel Interface Specification, Final Draft: Mar. 26, 1999.
Next Generation I/O Link Architecture Specification: Fabric Service Interface Specification, Final Draft: Mar. 26, 1999.
Next Generation I/O Link Architecture Specification: HCA Specification, Final Draft: Mar. 26, 1999.
Next Generation I/O Link Architecture Specification: Link Specification, Final Draft: Mar. 26, 1999.
Next Generation I/O: Principles of Operation, Final Draft: Mar. 26, 1999.
Next Generation I/O Architecture: Switch Specification, Final Draft: Mar. 26, 1999.

(Continued)

*Primary Examiner*—Meng-Al T. An
*Assistant Examiner*—Charles Anya
(74) *Attorney, Agent, or Firm*—Robert D. Anderson

(57) ABSTRACT

A host is coupled to a cluster fabric which includes a fabric-attached I/O controller. The host includes a processor, a memory coupled to the processor and an operating system. The operating system includes a kernel and a fabric bus driver to provide an I/O bus abstraction to the kernel for the cluster fabric to report multiple paths to a target fabric-attached I/O controller.

27 Claims, 11 Drawing Sheets

EXAMPLE SOFTWARE DRIVER STACKS FOR HOST HAVING FABRIC-ATTACHED I/O

OTHER PUBLICATIONS

Shah et al., "A Mechanism For Reporting Topology Changes In A Cluster"., U.S. Appl. No. 09/942,608., Intel Corporation.

Pinto et al., "A Mechanism for Managing Incoming Data Messages In A Cluster"., U.S. Appl. No. 09/994,779., Intel Corporation.

Raj., "Method And Device For Discovering Round Trip Delays Between Nodes In An Infiniband Cluster"., U.S. Appl. No. 09/669,668., Intel Corporation.

Shah., "System And Method For Providing Detailed Path Information To Clients"., U.S. Appl. No. 09/694,492., Intel Corporation.

Teitenberg et al., "Method And Apparatus For Distributing Events Among Multiple Channel Drivers"., U.S. Appl. No. 09/654,069., Intel Corporation.

Shah et al., Path Removal For Highly Connected Clusters., U.S. Appl. No. 09/658,491., Intel Corporation.

Shah., "Dynamic Removal Of A Driver Stack When A Parent Driver Uses A Child Driver"., U.S. Appl. No. 09/631,873., Intel Corporation.

Shah., "Delaying Loading Of Host-Side Drivers For Cluster Resources To Avoid Communication Failures"., U.S. Appl. No. 09/608,632., Intel Corporation.

Shah., "Method And Apparatus For Determining Multiple Instances Of The Same Type Of Service Agent"., U.S. Appl. No. 09/653,585., Intel Corporation.

PCI Local Bus Specification, Production Version, Revision 2.1, Jun. 1, 1995, 1992, 1993, 1995 PCI Special Interest Group.

Virtual Interface Architecture Specification, Draft Revision 1.0, Dec. 4, 1997, 1997 Compaq Computer Corp., Intel Corporation, Microsoft Corporation.

Next Generation I/O Link Architecture Specification: Fabric Service Interface Specification, Realease 1.0.0: Jul. 20, 1999.

Next Generation I/O Link Architecture Specification: HCA Specification, Release 1.0.0: Jul. 20, 1999.

Next Generation I/O Link Architecture Specification: Link Specification, Release 1.0.0: Jul. 20, 1999.

Next Generation I/O: Principles of Operation, Release 1.0.0: Jul. 20, 1999.

Next Generation I/O Link Architecture: Switch Specification, Release 1.0.0: Jul. 20, 1999.

Next Generation I/O Link Architecture Specification: Channel Interface Specification, Release 1.0.0: Jul. 20, 1999.

* cited by examiner

EXAMPLE SOFTWARE DRIVER STACKS FOR HOST HAVING BUS-BASED I/O

EXAMPLE SOFTWARE DRIVER STACKS FOR HOST HAVING
FABRIC-ATTACHED I/O

US 7,039,922 B1

CLUSTER WITH MULTIPLE PATHS BETWEEN HOSTS AND I/O CONTROLLERS

TECHNICAL FIELD

The present invention relates to a data network, and more particularly, relates to reporting multiple paths between hosts and I/O controllers in a cluster.

BACKGROUND

A cluster is a group of one or more hosts, input/output (I/O) units which contain one or more I/O controllers (e.g. SCSI adapters, network adapters etc.) and switches that are linked together by an interconnection fabric to operate as a single system to deliver high performance, low latency, and high reliability. In traditional clusters, hosts may use locally attached I/O controllers connected to one or more buses for operation. Current bus-based system 100 of a cluster may be shown in FIG. 1, including a plurality of separate devices such as a processor 102, an I/O and memory controller (or chipset) 104, a main memory 106, an I/O bridge 108 and one or more I/O devices, interconnected by one or more buses 103 and 105. A host bus 103 may provide a link between the processor 102, the I/O and memory controller 104 and the main memory 106. As opposed to the host bus 103, I/O bus 105 may be used as an interconnect transportation mechanism to transport data between highly integrated I/O devices, peripheral add-in boards and processor/memory subsystems. Examples of such an I/O bus used for high speed data transfer in servers, workstations, and personal computers may include an Industry Standard Architecture (ISA) bus, an Extended ISA (EISA) bus, and a more recent Peripheral Component Interconnect (PCI) bus as described in the latest version of "*PCI Local Bus Specification, Revision* 2.1" set forth by the PCI Special Interest Group (SIG) on Jun. 1, 1995. I/O devices may include storage devices, hard disk drives, or the like. I/O controllers 110 and 112 may be connected to the I/O bus 105 for access to the I/O devices. Similarly, a Local Area Network (LAN) Network Interface Card (NIC) 114 may be connected to the I/O bus 105 for access to a Local Area Network (LAN) 120.

However, such current bus-based systems may have a number of disadvantages and drawbacks. For instance, the I/O controllers 110, 112 are directly connected to the I/O bus 105, and are not connected to a network or a cluster. As a result, such I/O controllers 110, 112 on the I/O bus 105 may only be visible (or detectable) and addressable by the host processor 102, and not by any other host in a cluster, for example, hosts connected to LAN 120. Therefore, I/O resources of such a current bus-based system may not be readily available and effectively utilized in a cluster where performance and tolerance to failures are both important characteristics.

More importantly, the current bus-based systems do not have the property of multiple paths to the same I/O controller. Multiple paths between fabric-attached agents (e.g., hosts and I/O controllers) are desirable for purposes of optimizing performance and enhanced failure recovery properties. Some bus-based systems may support multiple I/O controllers (e.g. SCSI adapters, network adapters etc.) connected to the same set of devices (e.g. hard drives) but not multiple paths to a given I/O controller.

In addition, network adapter cards such as the LAN NIC 114 used in existing clusters typically have a single port per adapter. Hence, there is no known technique of creating separate device objects for separate ports of a network adapter for host-to-host communication in a cluster. For hosts that contain multiple network adapters, there is no known technique of creating a single device object and then providing a standard API interface application program interface (API) that can be used to get multiple port numbers to communicate with target fabric-attached agents (e.g., I/O controllers).

Accordingly, there is a need for a mechanism to report multiple paths to a target fabric-attached I/O controller and to report multiple ports connected to remote hosts in a cluster for host-to-host communication. Multiple paths to a target fabric-attached I/O controller in a cluster are essential for enabling a host to issue I/O requests at a faster rate and for dynamic load balancing to get over transient bottlenecks in certain segments of the cluster and to obtain better reliability and recoverability when link failures occur.

SUMMARY

Accordingly, various embodiments of the present invention are directed to a data network comprising a host coupled to a cluster fabric including one or more fabric-attached I/O controllers. The host includes a processor, a memory and an operating system including fabric driver software provided with an I/O bus abstraction for the cluster fabric to report multiple paths to a target fabric-attached I/O controller.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks and clusters designed to link together computers, servers, peripherals, storage devices, and communication devices for communications. Examples of such data networks may include a local area network (LAN), a campus area network (CAN), a global area network (GAN), a storage area network and a system area network (SAN), including newly developed data networks using Next Generation I/O (NGIO) and Future I/O (FIO) and Server Net and those networks which may become available as computer technology develops in the future. LAN systems may include Ethernet, FDDI (Fiber Distributed Data Interface), Token Ring LAN, Asynchronous Transfer Mode (ATM) LAN, Fiber Channel, and Wireless LAN. However, for the sake of simplicity, discussions will concentrate mainly on exemplary use of a simple data network having several example hosts and I/O units including I/O controllers that are linked together by an interconnection fabric, although the scope of the present invention is not limited thereto.

Figure 2:
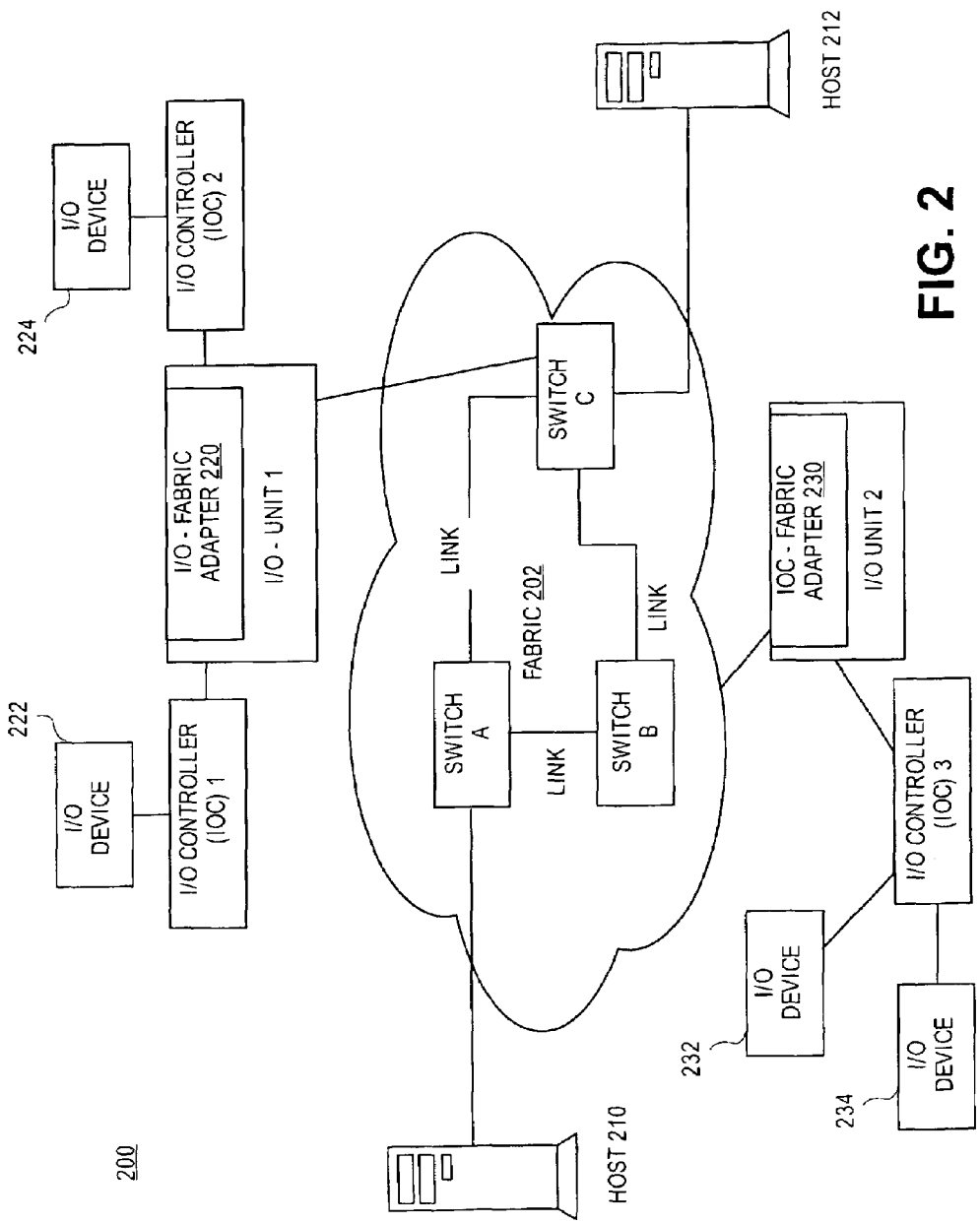
FIG. 2 illustrates an example data network according to an embodiment of the present invention.

Attention now is directed to the drawings and particularly to FIG. 2, which illustrates an example data network having several interconnected nodes for data communications. As shown in FIG. 2, the data network 200 may include, for example, an interconnection fabric (hereinafter referred to as "cluster fabric") 202 of one or more switches or switch elements A, B and C and corresponding physical links, and several end stations (nodes) which may correspond to one or more I/O units 1 and 2, computers and servers such as, for example, host 210 and host 212. I/O unit 1 may include one or more controllers connected thereto, including I/O controller 1 (IOC1) and I/O controller 2 (IOC2). Likewise, I/O unit 2 may include an I/O controller 3 (ICO3) connected thereto. Each I/O controller 1, 2 and 3 (IOC1, IOC2 and IOC3) may operate to control one or more I/O devices. For example, I/O controller 1 (IOC1) of the I/O unit 1 may be connected to I/O device 222, while I/O controller 2 (IOC2) may be connected to I/O device 224. Similarly, I/O controller 3 (IOC3) of the I/O unit 2 may be connected to I/O devices 232 and 234. The I/O devices may be any of several types of I/O devices, such as storage devices (e.g., a hard disk drive, tape drive) or other I/O device.

The hosts and I/O units including attached I/O controllers and I/O devices may be organized into groups known as clusters, with each cluster including one or more hosts and typically one or more I/O units (each I/O unit including one or more I/O controllers). The hosts and I/O units may be interconnected via a cluster fabric 202, which is a collection of switches A, B and C and corresponding physical links connected between the switches A, B and C.

In addition, each I/O unit includes an I/O controller-fabric (1OC-fabric) adapter for interfacing between the cluster fabric 202 and the I/O controllers (e.g., IOC1, IOC2 and IOC3). For example, IOC-fabric adapter 220 may interface the I/O controllers 1 and 2 (IOC1 and IOC2) of the I/O unit 1 to the cluster fabric 202, while IOC-fabric adapter 230 interfaces the I/O controller 3 (IOC3) of the I/O unit 2 to the cluster fabric 202.

The specific number and arrangement of hosts, I/O units, I/O controllers, I/O devices, switches and links shown in FIG. 2 is provided simply as an example data network. A wide variety of implementations and arrangements of any number of hosts, I/O units, I/O controllers, I/O devices, switches and links in all types of data networks may be possible.

Figure 3:
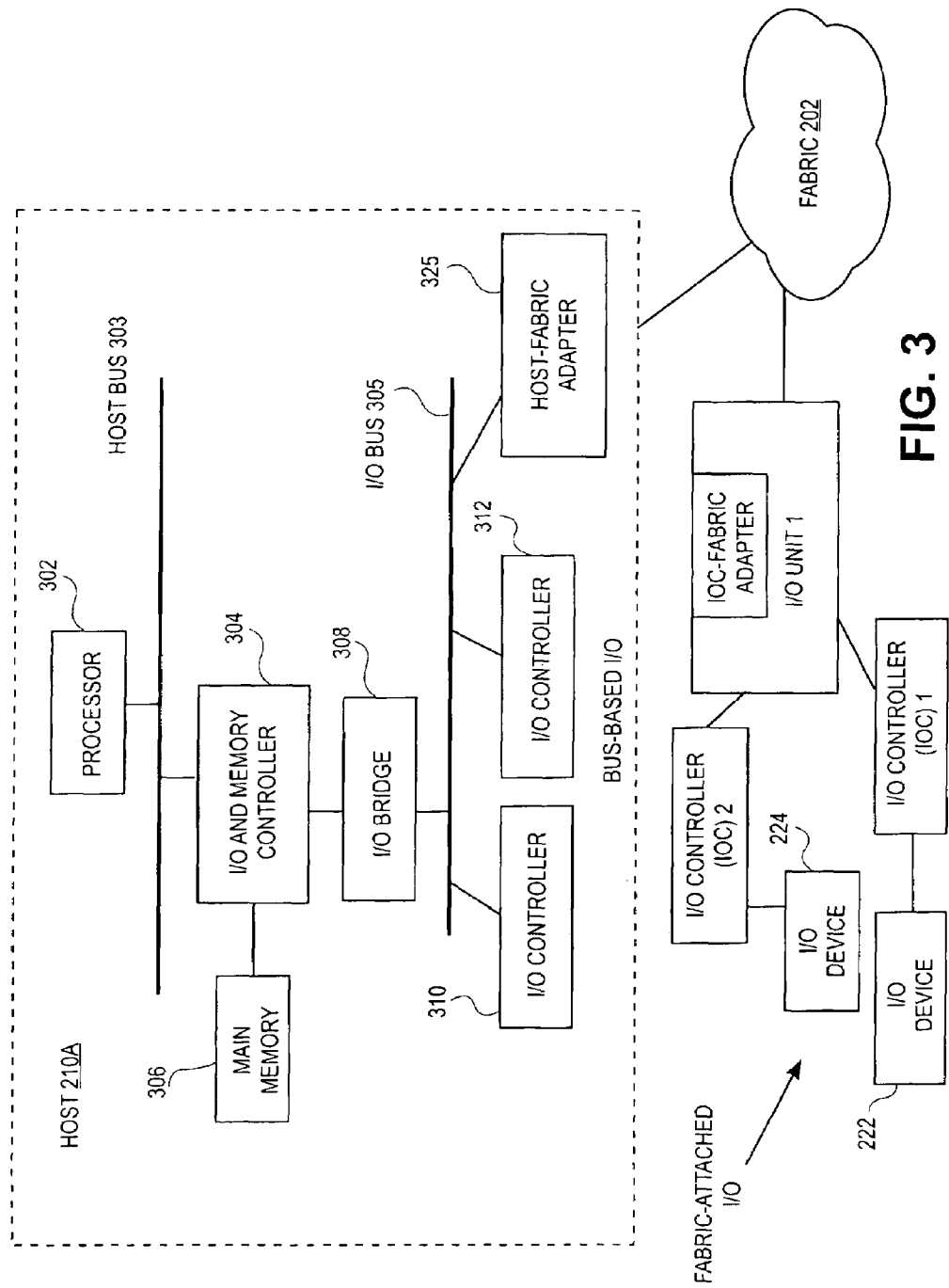
FIG. 3 illustrates a block diagram of a host of an example data network according to an embodiment of the present invention.
Figure 4:
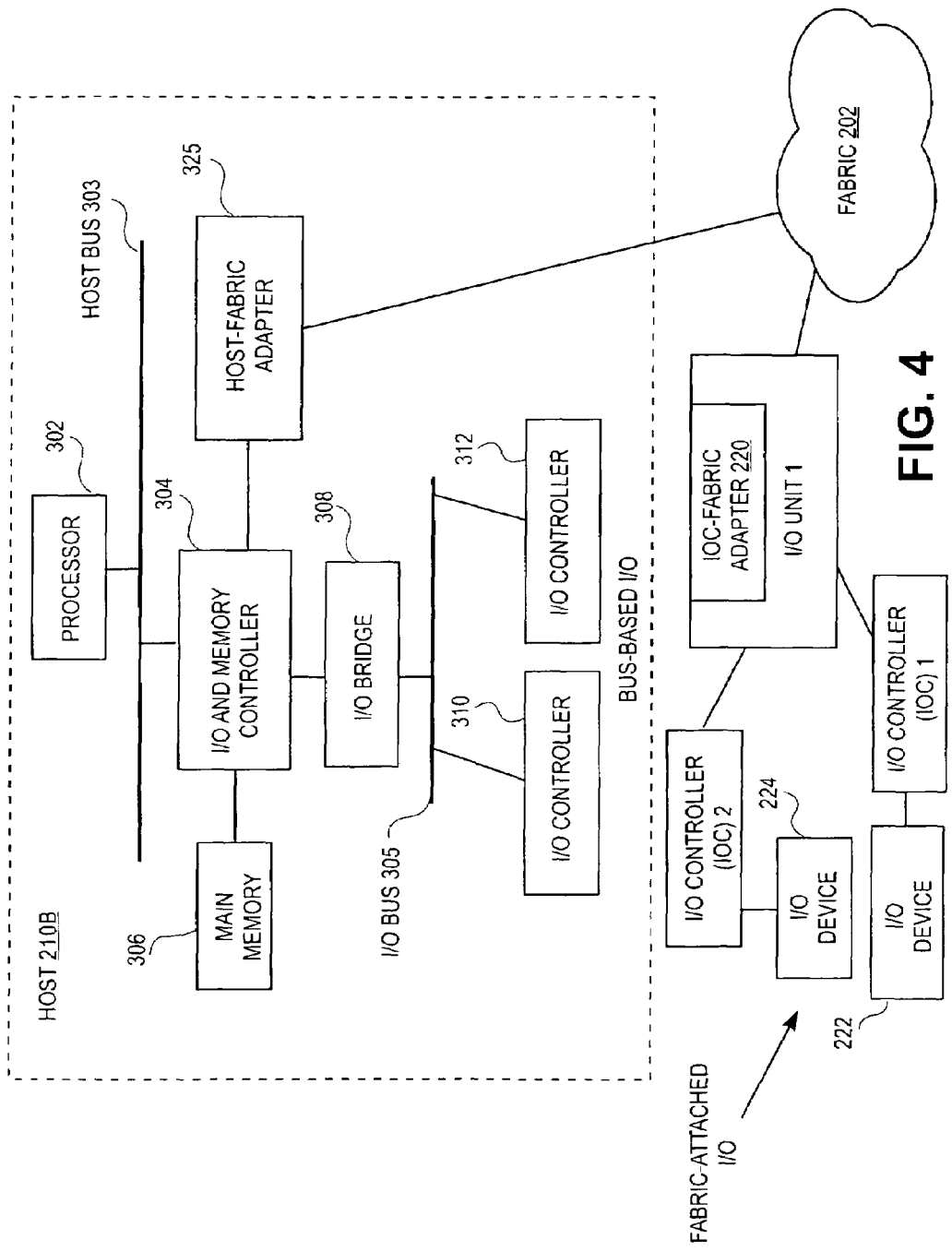
FIG. 4 illustrates a block diagram of a host of an example data network according to another embodiment of the present invention.

Example embodiments of a host (e.g., host 210) may be shown in FIGS. 3 and 4. In particular, FIG. 3 illustrates a block diagram of an example host according to one embodiment of the present invention. As shown in FIG. 3, a host 210A may include a processor 302 coupled to a host bus 303. An I/O and memory controller 304 (or chipset) may be connected to the host bus 303. A main memory 306 may be connected to the I/O and memory controller 304. An I/O bridge 308 may operate to bridge or interface between the I/O and memory controller 304 and an I/O bus 305. Several I/O controllers may be attached to I/O bus 305, including I/O controllers 310 and 312. I/O controllers 310 and 312 (including any I/O devices connected thereto) may provide traditional bus-based I/O resources.

A host-fabric adapter 325 may also be connected to the I/O bus 305. Host-fabric adapter 325 may be considered to be a type of a network interface card (e.g., usually including hardware and firmware) for interfacing the host 210A to a cluster fabric 202. The host-fabric adapter 325 may be utilized to provide fabric communication capabilities for the host 210A. For example, the host-fabric adapter 325 converts data between a host format and a format that is compatible with the cluster fabric 202. For data sent from the host 210A, host-fabric adapter 325 formats the data into one or more packets containing a sequence of one or more cells including header information and data information. In this embodiment shown in FIG. 3, the host-fabric adapter 325 may be attached to a slot of I/O bus 305 which may correspond to a PCI bus, for example.

FIG. 4 illustrates a block diagram of an example host according to another embodiment of the present invention. As shown in FIG. 4, a host 210B may include many of the same components as the host 210A of FIG. 3. However, the host-fabric adapter 325 is connected directly to the chipset or I/O and memory controller 304, rather than being attached to an existing I/O bus. This way the host-fabric adapter 325 may be freed from the limitations of the I/O bus. In addition to the host examples shown in FIGS. 3 and 4, there may be different ways in which the host-fabric adapter 325 may be connected to host 210B.

According to one example embodiment or implementation, the hosts or I/O units of the data network of the present invention may be compatible with the Next Generation Input/Output (NGIO) Specification as set forth by the NGIO Forum on Mar. 26, 1999. According to the NGIO Specification, the cluster fabric 202 may be an NGIO fabric, the host-fabric adapter 325 may be a Host Channel Adapter (HCA), and the IOC-fabric adapters may be Target Channel Adapters (TCA). The host channel adapter (HCA) may be used to provide an interface between the host 210 or 212 and the cluster fabric 202 via high speed serial links. Similarly, target channel adapters (TCA) may be used to provide an interface between the cluster fabric 202 and the I/O controller of either an I/O unit 1 or 2, or another network, including, but not limited to, local area network (LAN), Ethernet, ATM and fibre channel network, via high speed serial links. Both the host channel adapter (HCA) and the target channel adapter (TCA) may be implemented in compliance with "*Next Generation I/O Link Architecture Specification: HCA Specification, Revision 1.0*" as set forth by NGIO Forum on Jul. 20, 1999 for enabling the endpoints (nodes) to communicate to each other over an NGIO channel (s). Each NGIO host may contain one or more host-fabric adapters (e.g., HCAs). Likewise, each I/O unit may contain one or more IOC-fabric adapters (e.g., TCAs). However, NGIO is merely one example embodiment or implementation of the present invention, and the invention is not limited thereto. Rather, the present invention may be applicable to a wide variety of data networks, hosts and I/O controllers.

As described above, in traditional clusters the I/O controllers are not directly connected to the cluster fabric 202, but are only attached as part of a host 210. However, according to an embodiment of the present invention (e.g., as shown in FIGS. 3 and 4), the I/O units and respective I/O controllers are not connected to the cluster fabric 202 as a part of a host 210. Rather, the I/O units and I/O controllers are directly and separately connected to the cluster fabric 202. For example, I/O unit 1 including I/O controllers 1 and 2 (10C 1 and IOC2) and I/O unit 2 including an I/O controller 3 (IOC3) are directly (or independently) connected to the cluster fabric 202. In other words, the I/O units (and their connected I/O controllers and I/O devices) are attached as separate and independent I/O resources to the cluster fabric 202 as shown in FIGS. 2–4, rather than as part of a host. As a result, I/O units including I/O controllers (and I/O devices) connected to the cluster fabric 202 may be flexibly assigned to one or more hosts in the cluster (rather than having a predetermined or fixed host assignment based upon being physically connected to the host's local I/O bus). The I/O units, I/O controllers and I/O devices which are attached to the cluster fabric 202 may be referred to as fabric-attached I/O resources (i.e., fabric-attached I/O units, fabric attached I/O controllers and fabric-attached I/O devices) because these components are directly attached to the cluster fabric 202 rather than being connected as part of a host.

In addition, the hosts in a cluster may detect and then directly address I/O units and I/O controllers (and attached I/O devices) which are directly attached to the cluster fabric 202 (i.e., the fabric-attached I/O controllers). However, a mechanism must be provided that allows a host to detect and address fabric-attached I/O controllers and devices, while preferably being compatible with many currently available operating systems.

In many current operating systems, such as Windows 2000, all I/O controllers may be assumed to be attached to an I/O bus. In Windows 2000, for example, there is a separate kernel mode software driver for each I/O bus which understands the specific characteristics, capabilities, commands, format, timing, etc. of that particular I/O bus. Under Windows 2000, all bus drivers provide an interface or translation between the host operating system and the I/O controllers connected to the I/O bus. The host operating system (OS) provides a basic set of services to the I/O controllers (or to the device drivers of the I/O controllers) attached to the I/O bus.

The use of different I/O bus drivers allows the operating system (OS) to implement a common set of procedures to handle I/O resources or I/O controllers on different I/O buses. For example, bus drivers assist the host operating system (OS) in managing dynamic installation and removal of I/O controllers on that bus if the underlying bus hardware supports such installation and removal of the I/O controllers. In addition, bus drivers assist the operating system (OS) in power managing (e.g., powering down I/O devices during non-use) the I/O controllers on that I/O bus if the underlying I/O bus and I/O controllers support the same. The operating system (OS) may invoke or call specific or well known commands or entry points in the bus driver to query the capabilities of the I/O bus and the attached I/O controllers and to power manage the I/O controllers.

Figure 1:
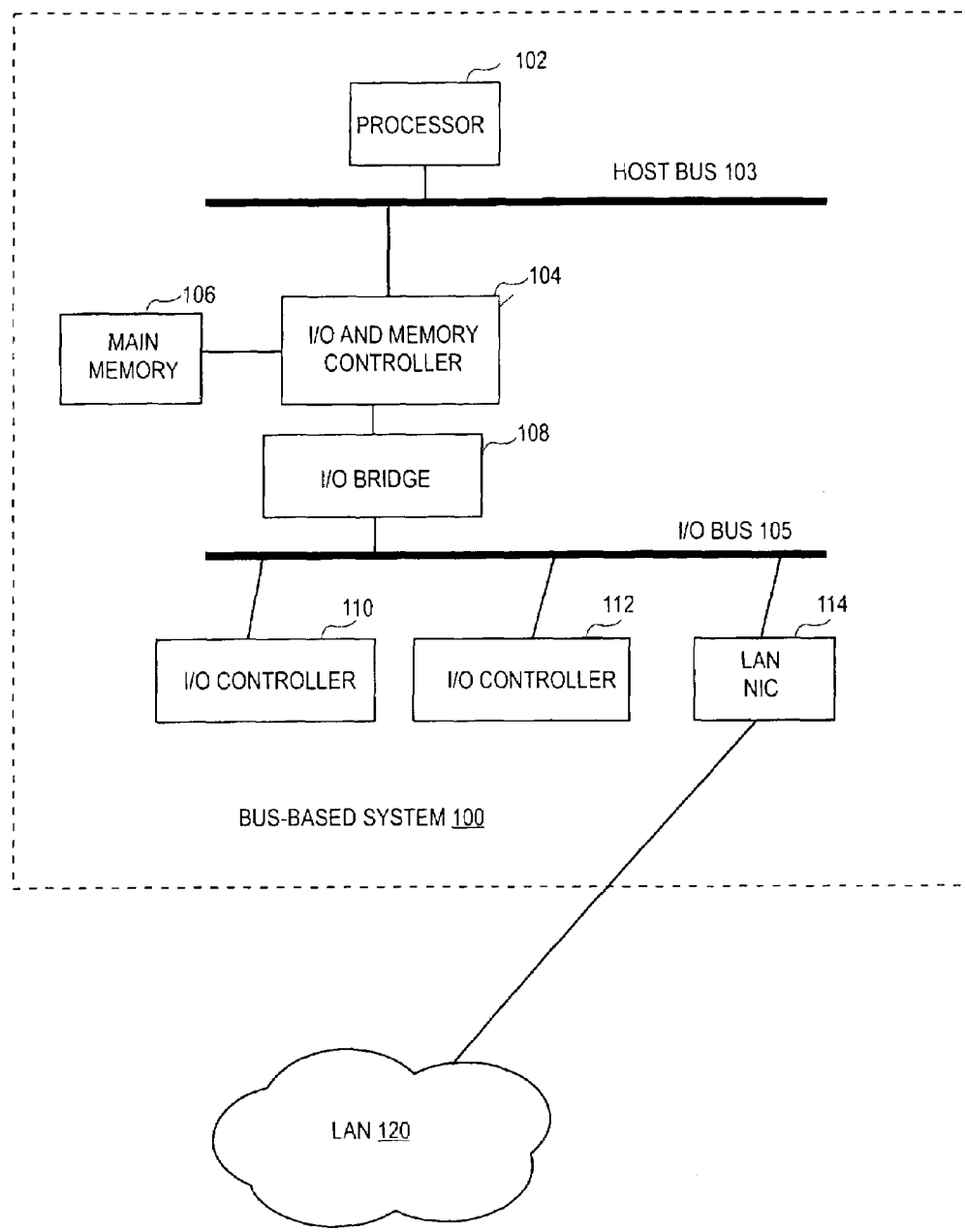
FIG. 1 illustrates an example less-advantageous bus-based system.
Figure 5:
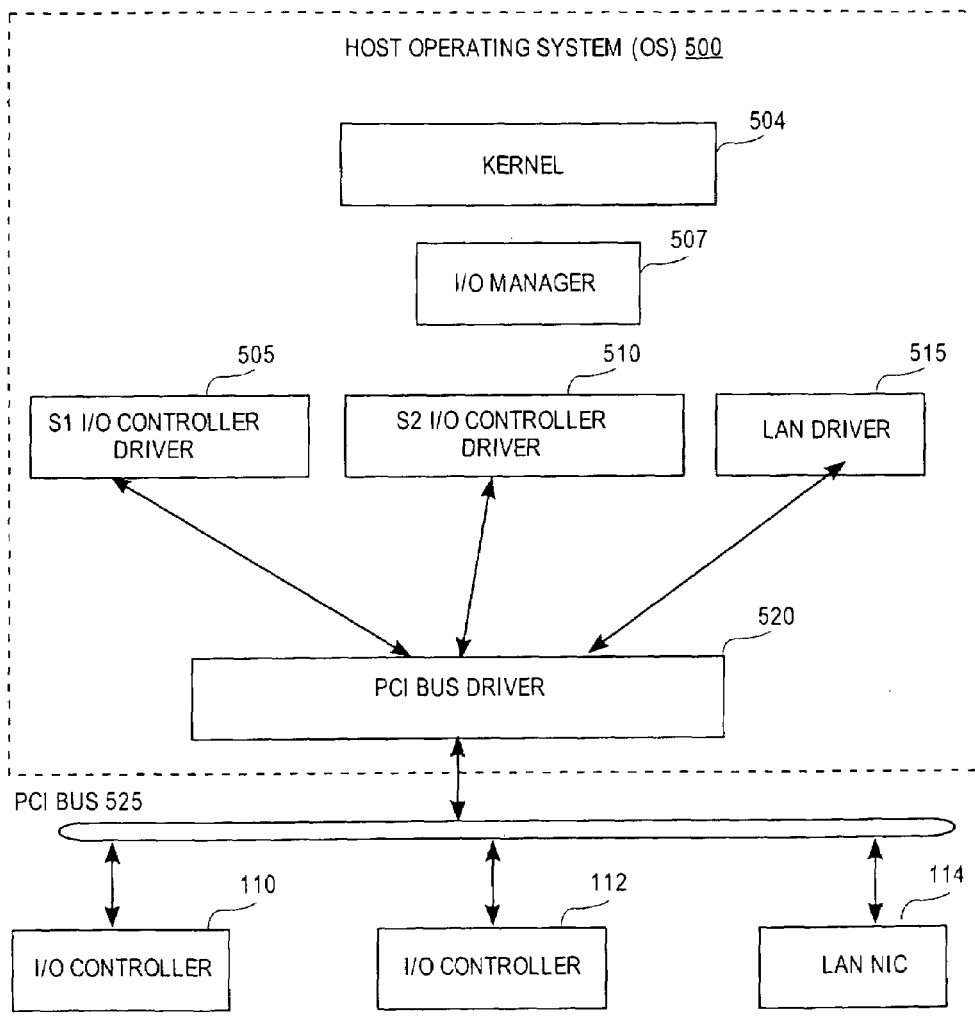
FIG. 5 illustrates an example software stack of a host of a current less-advantageous bus-based system shown in FIG. 1.

FIG. 5 illustrates an example software stack of a host of the current less-advantageous bus-based system 100 shown in FIG. 1. As shown in FIG. 5, a host operating system (OS) 500 is in communication with an I/O bus, such as a PCI bus 525. Several I/O devices may be attached to the slots of the PCI bus 525, including I/O controller 110 for a storage device S1, an I/O controller 112 for a storage device S2, and a LAN NIC 114, for example.

The host operating system 500 may include a kernel 504 and an I/O manager 507 for managing the I/O buses and attached I/O resources (I/O controllers and devices). The operating system 500 may also include a PCI bus driver 520 for interfacing between the I/O manager 507 of the operating system and the PCI bus 525.

The PCI bus driver 520 provides an interface to allow communications between the host and attached I/O controllers over a PCI bus 520. However, the PCI bus driver 520 may not be aware of the different features and capabilities of the different I/O controllers. Therefore, operating system (OS) 500 includes an I/O controller driver for each I/O controller, including I/O controller drivers 505 and 510, and a LAN driver 515, as examples. Each I/O controller driver may be provided for using the I/O services of the corresponding I/O controllers.

As described above, all I/O controllers are attached to a local I/O bus. As a result, the host may only detect and address I/O devices that are attached to the local I/O bus. Even if one or more fabric-attached I/O controllers are provided in such a bus-based system 100 (see FIG. 1), current operating systems do not allow a host to detect the presence or directly communicate with such fabric-attached I/O controllers because all I/O controllers are presumed to be local I/O controllers and do not support direct communication with a remote I/O controller.

Figure 6:
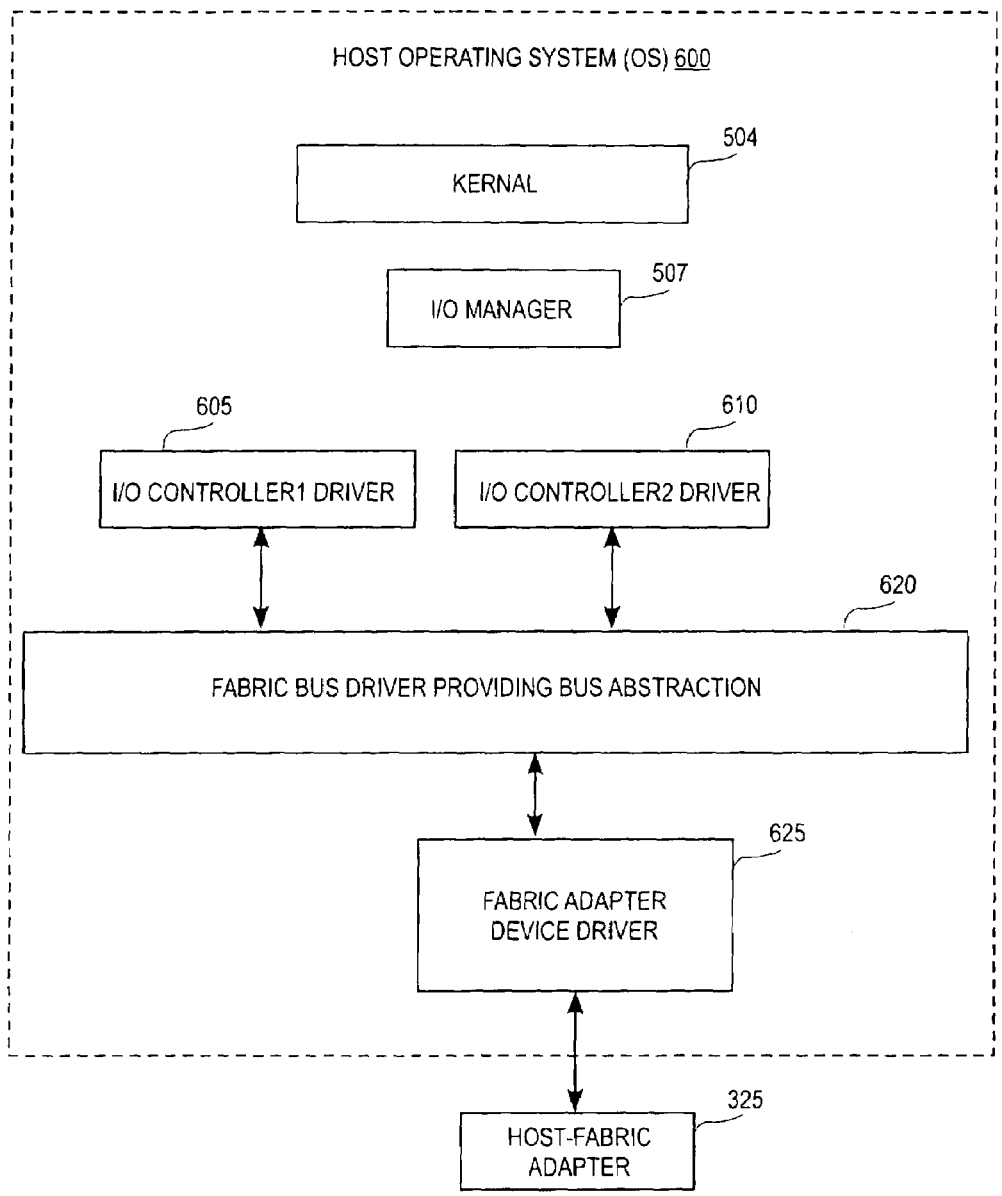
FIG. 6 illustrates a software driver stack of a host of a data network having fabric-attached I/O resources according to an example embodiment of the present invention.

FIG. 6 illustrates a software driver stack of a host having fabric-attached I/O resources according to an example embodiment of the present invention. As shown in FIG. 6, the host operating system (OS) 600 includes a kernel 504, an I/O manager 507, and a plurality of I/O controller drivers for interfacing to various I/O controllers, including I/O controller drivers 605 and 610. These components are the same as or similar to the currently available operating system shown in FIG. 5. According to an example embodiment, the host operating system (OS) 600 may be Windows 2000, and the I/O manager 507 may be a Plug-n-Play manager.

In addition, a fabric bus driver 620 and a fabric adapter device driver 625 may be provided for the cluster fabric 202. Both the fabric bus driver 620 and the fabric adapter device driver 625 may correspond to fabric adapter control software of the host operating system (OS) 600 utilized to establish communication with a target fabric-attached agent (e.g., I/O controller), including reporting multiple paths between the host 210 and the target fabric-attached agent (e.g., I/O controller). The fabric adapter control software may be a software module provided on a tangible medium, such as a floppy disk or compact disk (CD) ROM, or via Internet downloads, which may be available for a fabric administrator to conveniently plug-in or download into the host operating system (OS). Such software module may also be bundled with the existing operating system (OS) which may be activated by the fabric administrator for automating integration into the host operating system (OS). Alternatively, the fabric adapter control software may also be available as a firmware module or a comprehensive hardware/software module which may be built-in the host 210.

The fabric bus driver 620 may provide an I/O bus abstraction to the host operating system (OS) 600 (or to the I/O manager 507) for the cluster fabric 202. Thus, the fabric bus driver 620 may be known as a bus abstraction component. A traditional bus driver accepts a common set of high level operating system commands and translates them into I/O bus specific commands and formats. Likewise, the fabric bus driver 620 accepts the same set of high level operating system commands and translates them into fabric specific commands and formats.

The fabric adapter device driver 625 may be a device specific driver provided to control operation of the host-fabric adapter 325 (e.g., adapter card or hardware). The fabric bus driver 620 uses the communication services provided by the fabric adapter device driver 625 for the host-fabric adapter 325 to send and receive commands and information over the cluster fabric 202. The fabric adapter device driver 625 provides a way to initiate I/O requests to the target fabric-attached I/O controller and obtain results therefrom. Thus, the host processor 302 may issue I/O requests to one or more target fabric-attached I/O controllers through the fabric bus driver 625, the fabric adapter device driver 625 and the host-fabric adapter 325. The host-fabric adapter 325 translates the I/O requests between a host compatible format and a fabric compatible format. In this manner, the host processor 302 can communicate with fabric attached I/O controllers. The processor 302 and the host operating system (OS) 600 need not be aware that the fabric-attached I/O controllers are not attached to a local I/O bus since the I/O bus abstraction and the host/fabric translations are transparent to the processor 302 and operating system (OS) 600.

Although the cluster fabric 202 is not a "bus" in the traditional sense, such cluster fabric 202 may be advantageous for enabling the fabric bus driver 620 to provide an I/O bus abstraction to the I/O manager 507 so that the fabric attached I/O controllers may participate in the overall Plug-n-Play procedures (e.g., dynamic addition and removal of I/O controllers) and power management functions implemented by the host operating system (OS). In order to provide the I/O bus abstraction, the fabric bus driver 620 conforms to the common set of high level operating system commands and rules expected or implemented by the I/O manager 507 (or kernel 504). The fabric bus driver 620 provides a standard set of services of a bus driver. Thus, the fabric bus driver 620 presents the cluster fabric 202 to the I/O manager 507 as a local I/O bus, and presents one or more fabric-attached I/O controllers as local (or bus-based) I/O controllers. In this manner, the operating system (OS) does not have to be aware that the I/O resource (or fabric) behind the fabric bus driver 620 is not a local bus, but rather is a cluster fabric 202 including one or more fabric attached I/O controllers. The existence of the cluster fabric 202 and the remote location of the cluster fabric 202 and fabric-attached I/O controllers are preferably transparent to the host operating system (OS) 600. Thus, no changes may be necessary in the kernel 504 or I/O manager 507 to allow the host 210 to identify and communicate with fabric-attached I/O controllers.

The host operating system (OS) 600 (or the I/O manager 507 of OS 600) uses a standard set of procedures to query each bus driver to identify the I/O controllers attached to the bus. According to an embodiment of the present invention, the I/O manager 507 may use the same standard set of procedures to query the fabric bus driver 620 to identify the fabric-attached I/O controllers that are assigned to the host. Many I/O controllers may be attached to the cluster fabric 202. However, according to an embodiment of the invention, the fabric-attached I/O controllers (and their I/O devices) may be allocated or assigned to different hosts. Each I/O controller can be assigned or allocated to only one host. Alternatively, an I/O controller can be assigned to multiple hosts (or shared among hosts). The fabric bus driver 620 then identifies the fabric-attached I/O controllers that are assigned to the host and reports the list of I/O controllers to the I/O manager 507 using the same standard set of procedures used by other local I/O bus drivers and the I/O manager 507. Thus, the fabric bus driver 620 presents the cluster fabric 202 as a local I/O bus to the operating system (or to I/O manager 507) and presents the fabric-attached I/O controllers as local I/O controllers.

The fabric bus driver 620 may identify the list of fabric-attached I/O controllers assigned to the host in many different ways. A list of I/O controllers assigned to the host may be locally stored and accessed by the fabric driver 620, or the fabric driver 620 may query an external database or other host attached to the cluster fabric 202 to obtain the list of I/O controllers assigned to this particular host, as examples.

Figure 7:
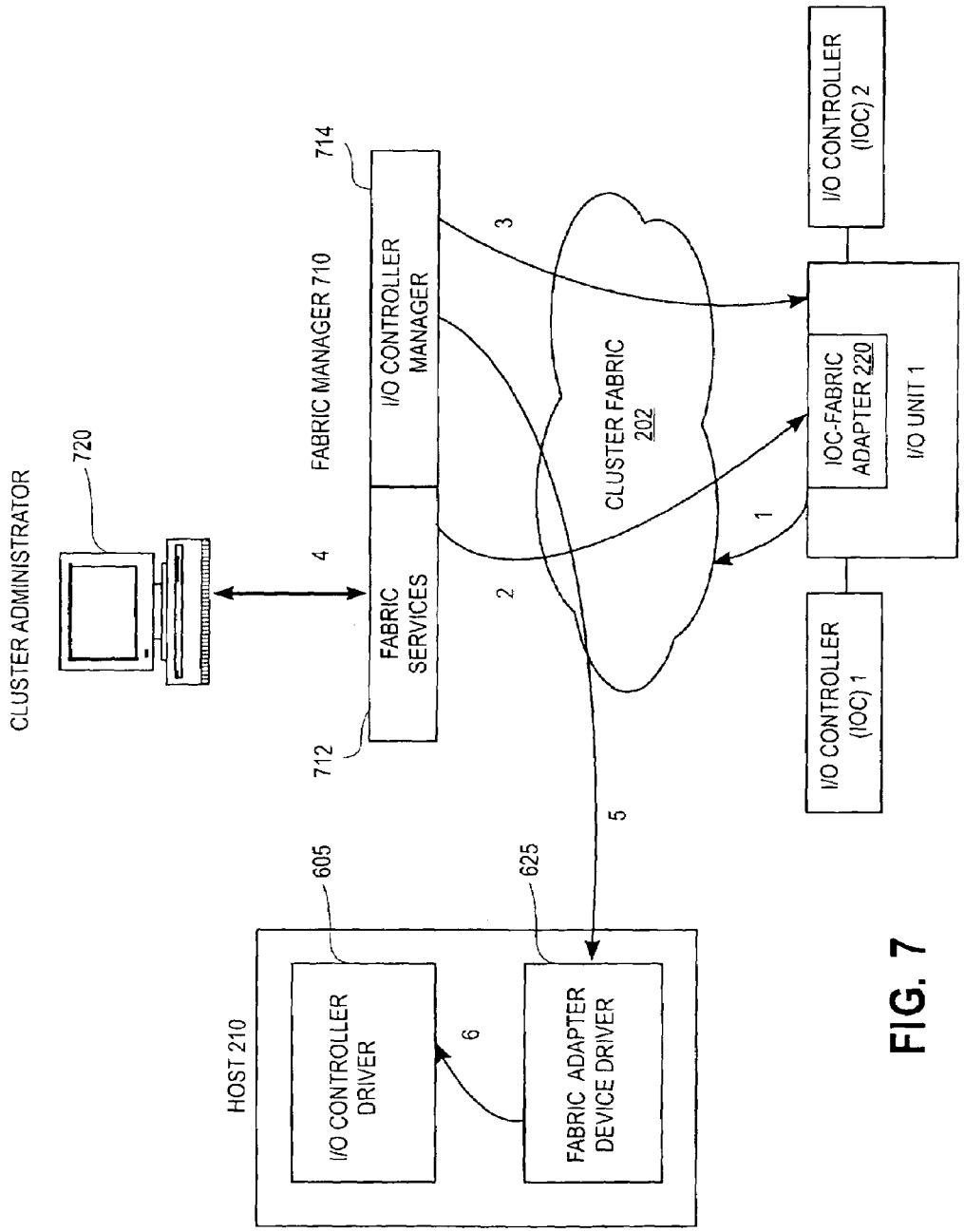
FIG. 7 illustrates an example data network including a fabric manager according to an embodiment of the present invention.

The cluster fabric 202, as shown in FIG. 7, may also include a central fabric manager 710 connected to all the switches A, B and C (see FIG. 2) for managing all network management functions, and a human fabric administrator for controlling specific aspects of the network via a computer 720. However, such a central network manager 710 may alternatively be incorporated as part of either the hosts 210 and 212, the I/O units 1 and 2, and possibly another data network for managing all network management functions. In either situation, the central fabric manager 710 may be provided with fabric services 712 and an I/O controller manager 714 for controlling the fabric-attached agents (e.g., hosts and I/O controllers). In addition, the central fabric manager 710 may be configured for learning physical cluster topology, detecting and managing faults or link failures in the data network 200 (see FIG. 2) and performing other network management functions, such as, for example, assignment of fabric-attached I/O controllers to cluster hosts 210 and 212, programming of forwarding tables at cluster switches such that the redundancy built into the topology is mapped as multiple paths between cluster hosts 210 and 212 and fabric-attached agents (e.g., I/O controllers), and reporting of multiple paths between the cluster hosts 210 and 212 and the fabric-attached agents (e.g., I/O controllers).

Fabric services 712 of the fabric manager 710 may be responsible for detecting I/O units (e.g., I/O units 1 and 2 shown in FIG. 2) attached to the cluster fabric 202 and then assigning the same a network address, such as a Media Access Control (MAC) address. According to an embodiment, each I/O unit port may be assigned a unique MAC address, and each I/O controller may be connected to a different port of the I/O unit. Thus, the hosts 210 and 212 may address the I/O controllers using the MAC address of their connected I/O unit and the port number identifying the port on the I/O unit where the I/O controller is attached (for example). According to another embodiment of the invention, the fabric services 712 of the fabric manager 710 may assign a different network address or MAC address to each I/O controller. Fabric services 712 may initialize the I/O unit to transition the ports to an active state.

When the I/O unit is initialized and assigned with a MAC address, the I/O controller manager 714 of the fabric manager 710 may identify the I/O controllers connected to the I/O unit. The I/O controller manager 714 may identify the I/O controllers attached to each I/O unit by sending a query (or query message) to each I/O unit (or to the new I/O unit), and with each I/O unit responding with a list of I/O controllers identifying the type of controller, the port number which the controller is attached, etc. The response from the I/O unit to the I/O controller manager 714 may also include an identification and type of each I/O device connected to each I/O controller.

Afterwards, the I/O controller manager 714 may determine which hosts are allowed to access each of the fabric-attached I/O controllers (e.g., assigns I/O controllers to hosts). Such I/O controller assignment may be secured from one or more input sources, such as, for example, a database which stores persistent associations between controllers and hosts, a human fabric administrator which assigns I/O controllers to the hosts 210 and 212 via computer 720 attached to the cluster fabric 202.

After the I/O controller assignment decision is made for each I/O controller (e.g., after the I/O controllers have been assigned to hosts), the I/O controller manager 714 sends a message to the affected hosts (i.e., sends a message to each host that will have access to a fabric-attached I/O controller). If sharing is desired, the I/O controller manager 714 may report the I/O controller to more than one host, and may indicate that the I/O controller is shared among multiple hosts. If sharing is not desired, however, the I/O controller manager 720 may report the I/O controller to a single host attached to the fabric 202 and may indicate that the access to the I/O controller is exclusive.

Referring to FIG. 7, steps 1–6 illustrate a process performed between the I/O unit 1, the fabric manager 710 and the host 210, when an I/O controller is connected or attached (i.e., plugged in) to the cluster fabric 202. At step 1 shown in FIG. 7, for example, an I/O unit 1 (including one or more connected I/O controllers 1 and 2) is connected or attached to the cluster fabric 202. At step 2, the fabric services 712 detects the new I/O controller attached to the cluster fabric 202 using, for example, a fabric trap mechanism or a fabric sweep mechanism. The fabric services 712 may then assign a MAC or network address to the new I/O unit and initialize the I/O unit by setting the ports of the I/O unit 1 to an active state.

At step 3 shown in FIG. 7, the I/O controller manager 714 identifies the I/O controllers connected to the I/O unit or contained in the I/O unit 1. Then, the new I/O controller may be assigned to one or more hosts in the cluster (i.e., to one or more hosts connected to the cluster fabric 202) at step 4. According to an embodiment of the invention, the I/O controller manager 714 may assign I/O controllers to one or more hosts by: a) looking up the I/O controllers or I/O units in a database to identify or match the corresponding host(s); b) consulting a default policy for I/O controller assignment; or c) consulting a human fabric administrator via computer 720. Assigning I/O controllers to hosts using a database lookup method allows an administrator to store persistent (e.g., permanent or semi-permanent) mappings or correspondence between I/O units or I/O controllers and hosts and allows this I/O controller assignment to occur quickly and automatically without human intervention. If a human fabric administrator is consulted, the human fabric administrator may be located within the network or cluster, or may be remotely located from the cluster fabric 202 (i.e., not directly connected to the cluster fabric 202).

At step 5 shown in FIG. 7, the I/O controller manager 7140 may send a message to the host-fabric adapter 325 of the host to which the new I/O controller has been assigned. This message to the host informs the host of the presence of the new I/O controller, and provides (explicitly or implicitly) authorization for the host to access the new I/O controller. In the event that an I/O controller has been removed from the cluster fabric 202 or has been reassigned to another host in the cluster fabric 202, a similar message may be sent to the host (the previous owner) indicating that the I/O controller is not available or is no longer assigned to the host. This allows the administrator and/or the I/O controller manager 714 to dynamically add, remove or reassign I/O controllers in the cluster fabric 202 and quickly inform the affected hosts of this change in the assignment or ownership of the fabric-attached I/O controllers.

The host-fabric adapter 325 may include its own unique network address or MAC address. Thus, the I/O controller manager 714 of the fabric manager 710 may communicate with the host 210 that is connected to the cluster fabric 202 by sending a message or packet to the address of the host-fabric adapter 325. The fabric adapter device driver (or control software) 625 for the host-fabric adapter 325 at the host 210 receives the message from the I/O controller manager 714. The message from the I/O controller manager 714 reports the new I/O controller to the host 210, and includes sufficient information to allow the host to use or access the I/O controller and the connected I/O devices.

For example, the message from the I/O controller manager 714 typically provides the network address or MAC address of the I/O unit, or the network address of the IOC-fabric adapter for the I/O unit. Each IOC-fabric adapter typically includes a unique network or MAC address (e.g., the network address of the IOC-fabric adapter 230 for I/O unit 2). This network address may correspond to the address of the I/O unit, and provides the address where the I/O controllers and I/O devices for the I/O unit can be accessed. As an example message or report from the I/O controller manager 714 to the host 210, the message may include information for identifying the address of the I/O unit, and information for identifying the I/O controllers connected to the I/O unit which may be accessed or used by the host 210. This information may, for example, indicate that there are two I/O controllers connected to the I/O unit 1 (including I/O controllers 1 and 2), and identify the type of each I/O controller. The message may also identify whether the I/O controller is exclusively assigned to (or owned by) host 210, or whether the I/O controller is shared among multiple hosts. Using this identification information, the host 210 may access the new fabric-attached I/O controller (e.g., read or write to the I/O controllers and I/O devices).

At step 6 shown in FIG. 7, the fabric adapter device driver 625 on the host 210 causes the host operating system (OS) 600 (see FIG. 6) to load the I/O controller specific driver 605 for the new I/O controller into main memory 306 (see FIG. 3) of the host 210.

As shown in FIG. 7, the I/O controller manager 714 may be part of the fabric manager 710 if centralized administration is desirable. If the centralized administration is not desirable (or if a distributed administration is desired), the I/O controller manager 714 may also be provided as a distributed set of software agents residing on one or more hosts in the cluster or attached to the cluster fabric 202. Under either arrangement, not all hosts may be required to participate in the administrative function of assigning fabric-attached I/O controllers to hosts.

Figure 8:
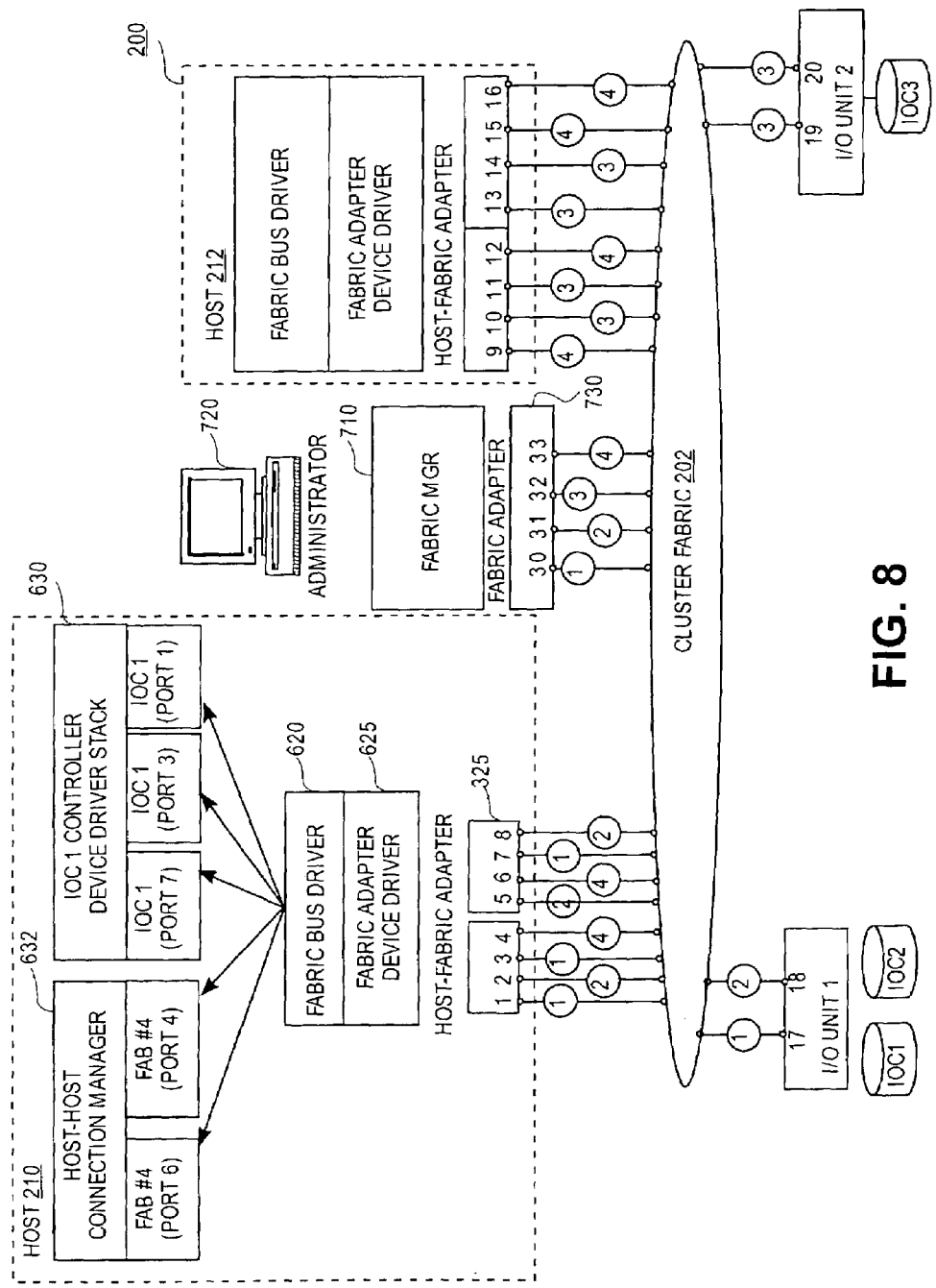
FIG. 8 illustrates an example data network including a fabric manager and a host with fabric adapter control software for reporting multiple paths to a target fabric-attached agent according to an embodiment of the present invention.

Turning now to FIG. 8, an example data network 200 including a fabric manager 710 and a host 210 with fabric adapter control software for reporting multiple paths to a target fabric-attached agent according to an embodiment of the present invention is illustrated. The fabric adapter control software may comprise a fabric bus driver 620 for providing "bus abstraction" and a fabric adapter device driver 625 for specific host-fabric adapter 325 shown in FIG. 6. The fabric bus driver 620 providing "bus abstraction" and the fabric manager 710 are responsible for reporting multiple paths to the host 210 that requests communication with a target fabric-attached I/O controller.

Once I/O controllers are assigned to the host 210, the fabric manager 710 may provide the fabric bus driver 620 running on the host 210 a list of I/O controllers assigned to that host 210. As part of the list of I/O controllers, information may be provided to determine which local ports may be used to communicate with a target fabric-attached I/O controller.

At the host 210, each instance of an I/O controller may be represented by a "device object" that is defined by the host operating system (OS) 600 (see FIG. 6). A controller-specific device driver stack 630 may be associated with the controller device object. The fabric bus driver 620 providing the I/O bus abstraction component may be responsible for causing at least one instance of the controller device driver stack 630 to be loaded for each assigned controller by creating the I/O controller device object. Each controller device driver stack 630 may then use the services of cluster adapter control software to communicate with its remote I/O controller. Host to host communication may be managed by "connection manager" 632. Connection manager 632 may implement its own protocol to set up and manage (e.g. flow control, error processing etc.) end-to-end connections with remote hosts (e.g., host 212). Different types of connection managers may coexist on each host. The fabric bus driver providing I/O bus abstraction can cause the loading of a connection manager by creating its device object and causing the appropriate connection manager driver to load. At the host 210, for example, the I/O controller device driver stack 630 or the host-to-host connection manager 632 need to know if multiple paths exist to a target fabric-attached agent (e.g., I/O controllers).

As shown in FIG. 8, the example data network may only use two hosts 210 and 212, two I/O units 1 and 2 each containing I/O controllers and a fabric manager 710 for the sake of simplicity. However, any number of hosts, I/O units, I/O controllers, I/O devices, switches and links may be possible. Each representative host 210 or 212 may be shown to have two host-fabric adapters 325 with four (4) cluster attachment points, known as "ports" per adapter. Access to each port may be provided by fabric adapter control software that runs on that host 210 or 212 or the I/O unit. Each port has an address that is unique across the cluster. The cluster administrator may use any addressing scheme appropriate for the cluster fabric 202 as long as unique addresses are assigned to each port. "Fabric Number" may be used to depict physical connectivity between different cluster ports. Ports that are connected to a given fabric number (e.g., fabric #1, #2, #3 and #4) can reach all other ports connected to that fabric number.

For example, if host 210 desires to communicate with host 212, port 4 or port 6 may be used to send a message since both these ports are depicted as being attached to fabric number 4. At host 212, ports 9, 12, 15 and 16 may be shown as attached to fabric number 4 and any of these ports can be used to receive the message from host 210. Likewise, if host 210 desires to communicate with I/O unit 1, any port that is connected to fabric number 1 or 2 may be used to send a message to the I/O unit 1. Examples of these ports may include ports 1, 2, 3, 5, 7 or 8.

As a preferred embodiment of the present invention, the fabric bus driver (bus abstraction component) 620 on a host 210 creates a separate device object for each port of the host-fabric adapter 325 that can be used to communicate with the target fabric-attached I/O controller. Multiple device objects for I/O controllers as well as connection managers may also be created. For example, three (3) separate device objects for I/O controller 1 (IOC1) may be created by the fabric bus driver (bus abstraction component) 620 since three (3) local ports may be used to communicate with I/O controller 1 (IOC1). The same controller driver stack 630 may manage all three (3) instances of I/O controller 1 (IOC1). The I/O controller driver 605 (see FIG. 6) may be responsible for asking the I/O controller 1 (IOC1) and determining that all 3 reported instances of the controller driver stack 630 are referring to the same physical controller. The I/O controller driver 605 may then use the multiple paths for load balancing I/O requests or for better fault tolerance in case one or more paths to the I/O controller 1 (IOC1) fail. In the same way, the fabric bus driver (bus abstraction component) 620 at host 210 creates two (2) device objects for the host-to-host connection manager 632 since two (2) local ports may be used to communicate with other hosts connected to fabric number 4. For simplicity, FIG. 8 does not show the device objects corresponding to I/O controller 2 (IOC2).

New redundant paths in the cluster fabric 202 may be created by the fabric administrator via the fabric manager 710 installed at the computer 720 when the need arises. For example, assume that the fabric administrator creates a new path between host 210 and I/O controller 1 (IOC1). This can be done by adding a new fabric adapter at host 210 or by changing the existing cabling to create a new path using a port in an existing fabric adapter 325. The fabric manager 710 may then detect the new topology and program switches to create the new path. The fabric adapter control software (fabric bus driver 620 and fabric adapter device driver 625) may detect the change in the fabric adapter 325 (i.e. the attached fabric number for a local port has changed) or from the fabric manager 710. When the fabric bus driver (bus abstraction component) 620 learns of the new path, a new device object for each assigned controller or connection manager connected to that fabric number is created. An existing path to a target agent may be removed due to an error or due to manual reconfiguration of the cluster. When this change is detected, the fabric bus driver (bus abstraction component) 620 destroys all device objects that were using the port that was reconfigured or lost. This causes the affected instances of the controller driver stacks 630 or connection managers 632 to be unloaded.

Figure 9:
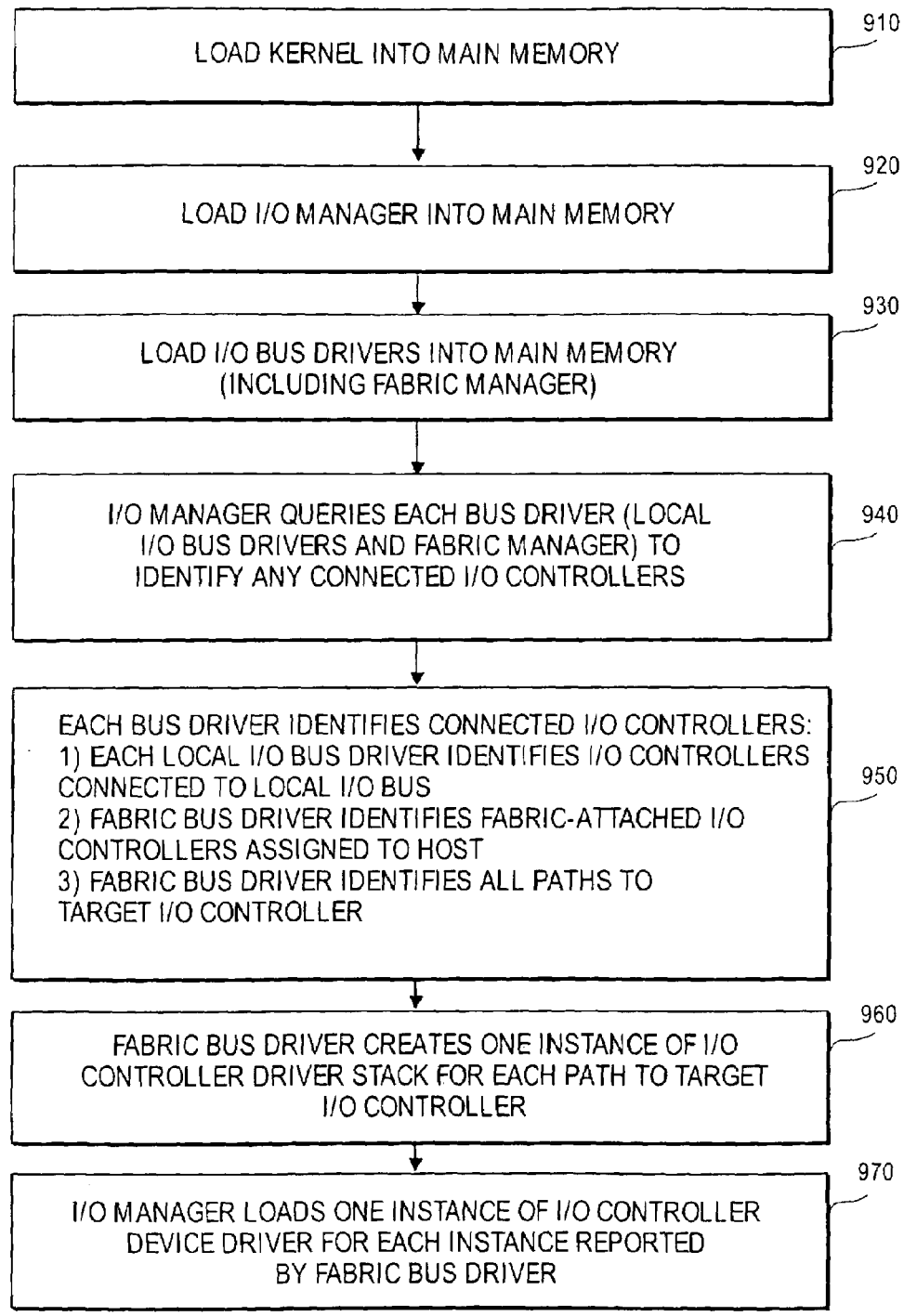
FIG. 9 illustrates a flowchart of a host process of reporting multiple paths to a target fabric-attached agent during host initialization shown in FIG. 8.

FIG. 9 illustrates a flowchart of a host process of reporting multiple paths to a target fabric-attached agent during host initialization shown in FIG. 8. At block 910, kernel 504 may be loaded into main memory 306 shown in FIGS. 3 and 4 (e.g., at power-on with the assistance of the execution of the Basic Input Output System or BIOS). The Kernel 504 may then execute to perform several other tasks or functions for initialization. At block 920, the I/O manager 507 may be loaded into main memory 306 for execution.

At block 930, each of the I/O bus drivers may be loaded into main memory 306 and executed. These "I/O bus drivers" loaded into main memory 306 include the I/O bus drivers for the local I/O buses (e.g., PCI bus driver) and the fabric bus driver (bus abstraction component) 620. As noted above, the fabric bus driver (bus abstraction component) 620 may be presented to the host operating system (OS) 600 as an I/O bus driver.

At block 940, the I/O manager 507 queries (or requests) each bus driver (including the fabric bus driver 620) to identify any connected I/O controllers.

At block 950, each "bus driver" identifies each connected I/O controller. The local I/O bus drivers identify each I/O controller connected to the corresponding local I/O buses. Similarly, the fabric bus driver (bus abstraction component) 620 identifies each fabric-attached I/O controller which is assigned to the host 210. Then the fabric bus driver (bus abstraction component) 620 identifies all paths to the target fabric-attached I/O controller.

At block 960, the fabric bus driver (bus abstraction component) 620 creates one instance of the I/O controller driver stack for each path to the target fabric-attached I/O controller.

At block 970, the I/O manager 507 loads one instance of I/O controller driver (specific to each type of I/O controller) 605 into main memory 306 for each instance reported by the fabric bus driver (bus abstraction component) 620. Since each instance of the I/O controller driver represents a different path to the I/O controller, different paths may be used by using different instances of the I/O controller driver.

Figure 10:
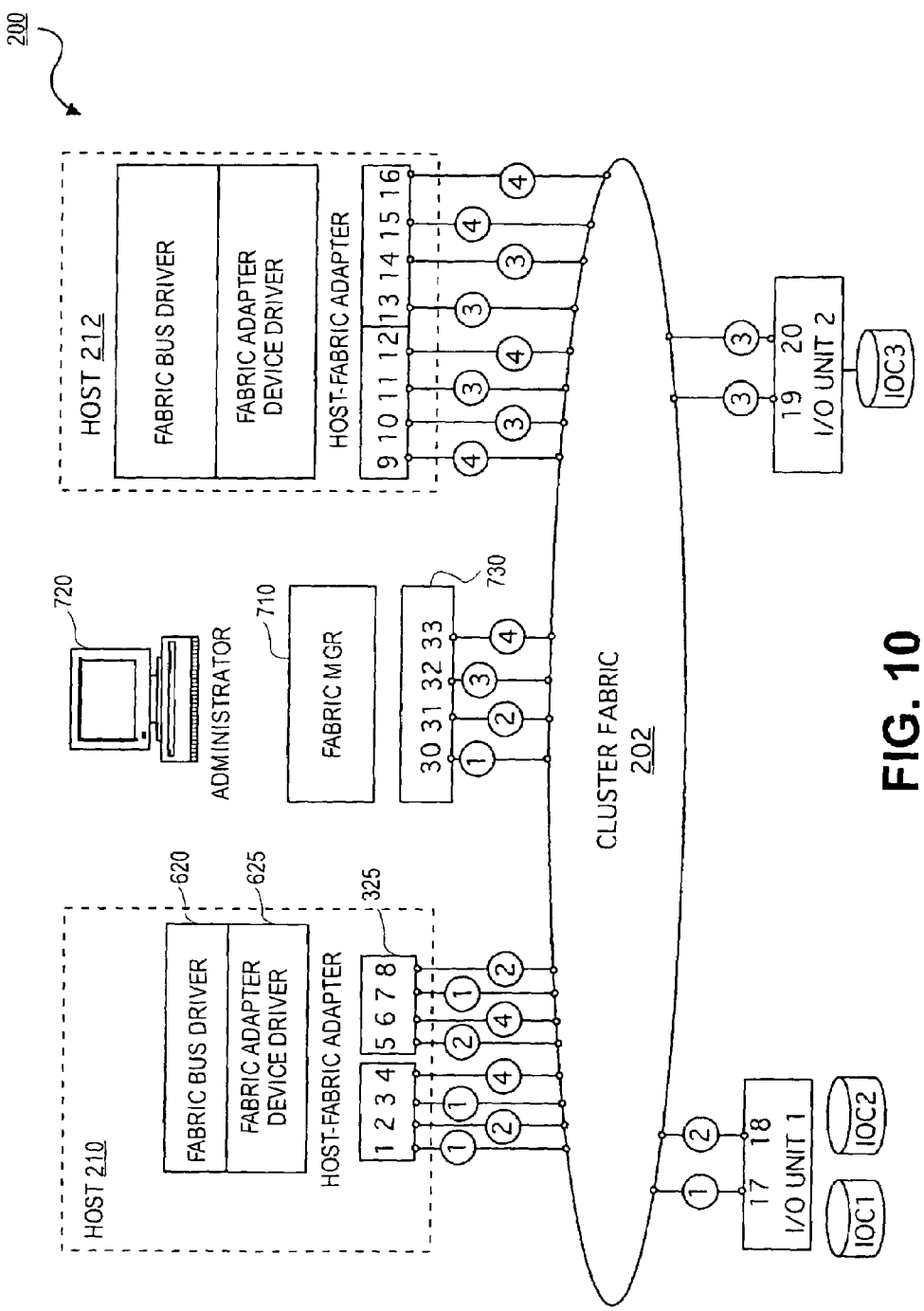
FIG. 10 illustrates an example data network including a fabric manager and a host with fabric adapter control software for reporting multiple paths to a target fabric-attached agent according to another embodiment of the present invention.

FIG. 10 illustrates an example data network including a fabric manager and a host with fabric control software for reporting multiple paths to a target fabric-attached agent according to another embodiment of the present invention. As shown in FIG. 10, the example data network 200 may use the same two hosts 210 and 212, two I/O units 1 and 2 each containing I/O controllers and a fabric manager 710 shown in FIG. 8. However, the fabric bus driver (bus abstraction component) 620 of FIG. 10 creates a single device object (and hence a single instance of the driver stack) for an I/O controller or connection manager even if multiple local ports can be used to communicate with the target fabric-attached I/O controller. The fabric bus driver (bus abstraction component) 620 provides a standard interface such as an application program interface (API) by which the I/O controller driver 605 or the connection manager 632 can query for a list of local ports which may be used to communicate with the target fabric-attached I/O controller. The API takes as input the fabric number to which the I/O controller (or connection manager 632) is connected. As output, the fabric bus driver (bus abstraction component) 620 returns the list of port numbers in the local fabric adapters that are connected to the given fabric number. As part of the API call, the calling I/O controller driver 605 (or connection manager 632) can provide the address of a function that can be invoked if the fabric bus driver (bus abstraction component) 620 detects any topology changes. For example, if a new path is created to an assigned I/O controller, the fabric bus driver (bus abstraction component) 620 can invoke the function in the affected controller device driver to inform the same that a new local port can be used. The same process may be used to report the removal of an existing path. New device objects are not created when new paths are reported. Device objects are not deleted when an existing path breaks except if this was the only path to the target fabric-attached I/O controller.

Figure 11:
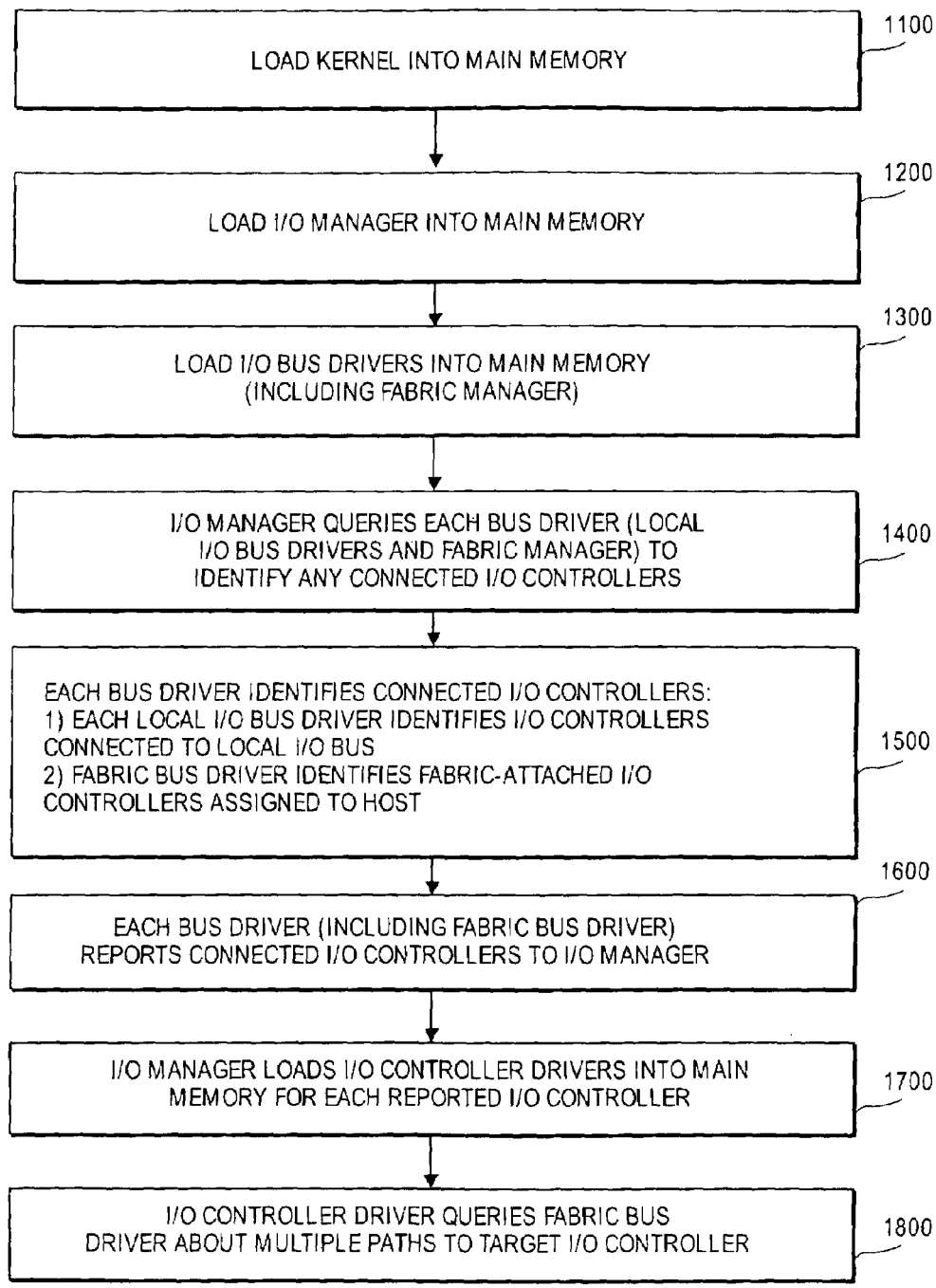
FIG. 11 illustrates a flowchart of a host process of reporting multiple paths to a target fabric-attached agent during host initialization shown in FIG. 10.

FIG. 11 illustrates a flowchart of a host process of reporting multiple paths to a target fabric-attached agent during host initialization shown in FIG. 10. At block 1100, kernel 504 may be loaded into main memory 306 shown in FIGS. 3 and 4 (e.g., at power-on with the assistance of the execution of the Basic Input Output System or BIOS). The Kernel 504 may then execute to perform several other tasks or functions for initialization. At block 1200, the I/O manager 507 may be loaded into main memory 306 for execution.

At block 1300, each of the I/O bus drivers may be loaded into main memory 306 and executed. These "I/O bus drivers" loaded into main memory 306 include the I/O bus drivers for the local I/O buses (e.g., PCI bus driver) and the fabric bus driver (bus abstraction component) 620. As noted above, the fabric bus driver (bus abstraction component) 620 may be presented to the host operating system (OS) 600 as an I/O bus driver.

At block 1400, the I/O manager 507 queries (or requests) each bus driver (including the fabric bus driver 620) to identify any connected I/O controllers.

At block 1500, each "bus driver" identifies each connected I/O controller. The local I/O bus drivers identify each I/O controller connected to the corresponding local I/O buses. Similarly, the fabric bus driver (bus abstraction component) 620 identifies each fabric-attached I/O controller which is assigned to the host 210. Then the fabric bus driver (bus abstraction component) 620 identifies all paths to the target fabric-attached I/O controller.

At block 1600, the fabric bus driver (bus abstraction component) 620 reports the connected I/O controllers as requested.

At block 1700, the I/O manager 507 loads one instance of I/O controller driver (specific to each type of I/O controller) 605 into main memory 306 for each type of I/O controller to the I/O manager 507. This allows the host processor 302 to communicate with each reported I/O controller to perform a configuration, perform read and write operations to one or more I/O devices connected to the I/O controller, etc.

Also at block 1700, the fabric bus driver (bus abstraction component) 620 creates one instance of the I/O controller driver stack even if multiple paths exist to the target fabric-attached I/O controller.

At block 1800, the I/O controller driver 605 queries the fabric bus driver 620 about multiple paths to the target fabric-attached I/O controller.

As described from the foregoing, the present invention advantageously provides at least two separate techniques in which fabric adapter control software (including bus abstraction component) installed at a host may be used to report multiple paths to a target fabric-attached I/O device to provide better reliability and recoverability when physical link failures occur in a cluster. Multiple paths are provided to a target agent in a cluster for enabling a host to issue cluster requests at a faster rate and for dynamic load balancing to get over transient bottlenecks in certain segments of the cluster.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of redundant type networks, including, but not limited to, Next Generation Input/Output (NGIO), ATM, SAN (system area network, or storage area network), server net, Future Input/Output (FIO), fiber channel, Ethernet). In addition, storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host comprising:
a processor;
a memory coupled to the processor;
an operating system provided with an I/O bus abstraction to report multiple path via a cluster fabric to a target fabric-attached I/O controller that may be shared between the host and another host via the cluster fabric, the operating system to direct service requests between the host and the target fabric-attached I/O controller in response to the multiple paths; wherein the operating system further comprises:
a kernel;
a fabric bus driver to provide said I/O bus abstraction to the kernel for the cluster fabric to report the multiple paths to the target fabric-attached I/O controller; and said fabric bus driver presents the cluster fabric to the kernel as a local I/O bus, and presents one or more target fabric-attached I/O controllers to the kernel as local I/O controller.

2. The host as claimed in claim 1, further comprising a host-fabric adapter provided to interface the host to the cluster fabric.

3. The host as claimed in claim 2, further comprising a fabric adapter device driver provided to control operation of the host-fabric adapter.

4. The host as claimed in claim 3, wherein said fabric bus driver creates a separate device object for each port of the host-fabric adapter that can be used to communicate with the target fabric-attached I/O controller and establish the multiple paths to the target fabric-attached I/O controller.

5. The host as claimed in claim 3, wherein said multiple paths are utilized for load balancing I/O requests and/or for fault tolerance when one or more paths to the target fabric-attached I/O controller fail.

6. The host as claimed in claim 3, wherein said fabric bus driver creates a single device object for the target fabric-attached I/O controller even if multiple ports of the host-fabric adapter can be used to communicate with the target fabric-attached I/O controller.

7. An operating system for a host coupled to a cluster fabric that is coupled to one or more fabric attached I/O controllers that may be allocated or assigned to different hosts, comprising:
a kernel;
an I/O manager operatively coupled to the kernel;
one or more I/O controller drivers operatively coupled to the kernel, each I/O controller driver specific for a specific type of I/O controller that may be allocated or assigned to different hosts; and
a fabric bus driver operatively coupled to the I/O manager to provide an I/O bus abstraction to the I/O manager to report multiple paths to a target fabric-attached I/O controller that may be shared between the host and another host via the cluster fabric, the operating system to direct service requests between the host and the target fabric-attached I/O controller in response to the multiple paths.

8. The operating system as claimed in claim 7, wherein said fabric bus driver appears to the I/O manager as a local I/O bus driver.

9. The operating system as claimed in claim 7, wherein said fabric driver presents the cluster fabric to the I/O manager as a local I/O bus and presents the one or more fabric attached I/O controllers as local I/O controllers connected to the local I/O bus.

10. The operating system as claimed in claim 7, further comprising one or more local I/O bus drivers operatively coupled to the I/O manager.

11. The operating system as claimed in claim 10, wherein said local I/O bus drivers and said fabric bus driver communicate with the I/O manager using a common set of procedures.

12. A cluster comprising:
a cluster fabric;
a host coupled to the cluster fabric, the host including an operating system;
an I/O controller attached to the cluster fabric, wherein the I/O controller may be allocated or assigned to different hosts; and
a fabric manager coupled to the cluster fabric, to assign I/O controllers in the cluster fabric to at least said host and sending messages to said host indicating that the I/O controller has been assigned;
wherein said operating system includes a fabric bus driver provided to report multiple paths to a target fabric-attached I/O controller that may be shared between the host and another host via the cluster fabric, the operating system to direct service requests between the host and the target fabric-attached I/O controller in response to the multiple paths.

13. The cluster as claimed in claim 12, wherein said operating system further comprises a kernel, and said fabric bus driver provided said I/O bus abstraction to the kernel for the cluster fabric to report the multiple paths to the target fabric-attached I/O controller.

14. The cluster as claimed in claim 12, further comprising a host-fabric adapter provided to interface the host to the cluster fabric, and a fabric adapter device driver provided to control operation of the host-fabric adapter.

15. The cluster as claimed in claim 13, wherein said fabric bus driver creates a separate device object for each port of the host-fabric adapter that can be used to communicate with the target fabric-attached I/O controller and establish the multiple paths to the target fabric-attached I/O controller.

16. The cluster as claimed in claim 15, wherein said multiple paths are utilized for loading balancing I/O requests and/or for fault tolerance when one or more paths to the target fabric-attached I/O controller fail.

17. The cluster as claimed in claim 15, wherein said fabric bus driver creates a single device object for the target fabric-attached I/O controller even if multiple ports of the host-fabric adapter can be used to communicate with the target fabric-attached I/O controller.

18. The cluster as claimed in claim 12, wherein said fabric manager comprises:
fabric services to detect the connection or presence of the target fabric-attached I/O controller and to assign a network address to the target fabric-attached I/O controller; and
an I/O controller manager coupled to the fabric services to assign the target fabric-attached I/O controller to said host and to send messages to said host indicating that the target fabric-attached I/O controller has been assigned.

19. A computer usable medium having computer readable program code embodied therein for use in a host system to report multiple paths via a cluster fabric to a target fabric-attached I/O controller, said computer program code when executed, cause a computer to:

create and report multiple paths from the host via the cluster fabric to the target fabric-attached I/O controller that may be shared between the host and another host via the cluster fabric;

enable reporting the multiple paths to the target fabric-attached I/O controller;

direct service requests between the host and the target fabric-attached I/O controller in response to the multiple paths;

present the cluster fabric to a kernel as local I/O bus; and present one or more target fabric-attached I/O controllers to the kernel as local I/O controllers.

20. A method of initializing a host to report multiple paths to a target agent via a cluster fabric, comprising:

loading an operating system kernel into a memory;

loading an I/O manager into the memory;

loading a local I/O bus driver and a fabric bus driver providing a local I/O bus abstraction for the cluster fabric into the memory;

enabling the local I/O bus driver to identify any local I/O controllers connected to a corresponding local I/O bus;

enabling the fabric bus driver to identify any fabric-attached I/O controllers assigned to the host, and report the identified local I/O controllers connected to the local I/O bus and the identified fabric-attached I/O controllers to the I/O manager, wherein the fabric-attached I/O controllers may be allocated or assigned to different hosts;

loading an I/O controller driver into the memory for each reported I/O controller;

enabling the fabric bus driver to create and report multiple paths via the cluster fabric to a target fabric-attached I/O controller that may be shared between the host and another host via the cluster fabric; and directing service requests between the host and the target fabric-attached I/O controller in response to the multiple paths.

21. The method as claimed in claim 20, wherein said identified local I/O controllers connected to the local I/O bus and said identified fabric-attached I/O controllers to the I/O manager are reported using a common set of procedures or commands.

22. A method of initializing a host to report multiple paths to a target agent via a cluster fabric, comprising:

loading an operating system kernel into a memory;

loading an I/O manager into the memory; and loading a local I/O bus driver and a fabric bus driver providing a local I/O bus abstraction for the cluster fabric into the memory;

enabling the local I/O bus driver to identify any local I/O controllers connected to a corresponding local I/O bus;

enabling the fabric bus driver to identify any fabric-attached I/O controllers assigned to the host, identifies all paths to a target fabric-attached I/O controller that may be shared between the host and another host via the cluster fabric, create one instance of an I/O controller driver stack for each path to the target fabric-attached I/O controller, and report all multiple paths via the cluster fabric to a target fabric-attached I/O controller that may be shared between the host and another host via the cluster fabric; and directing service requests between the host and the target fabric-attached I/O controller in response to the multiple paths.

23. A method of initializing a host to report multiple paths via a cluster fabric to a target fabric-attached I/O device comprising:

loading an operating system (OS) into a memory;

identifying all fabric-attached I/O devices assigned to the host, wherein the fabric-attached I/O devices may be shared between the host and another host via the cluster fabric;

reporting the identified fabric-attached I/O devices;

creating and reporting multiple paths via the cluster fabric to the target fabric-attached I/O device that may be shared between the host and another host via the cluster fabric;

directing service requests between the host and the target fabric-attached I/O device in response to the multiple paths; and the identified fabric-attached I/O devices are reported, via a fabric bus driver included in the operating system (OS) to provide a local I/O bus abstraction for the cluster fabric into the memory, using a common set of procedures or commands.

24. The method as claimed in claim 23, wherein the fabric bus driver is further configured to create a separate device object for each port of the host that can be used to communication with the target fabric-attached I/O device and establish the multiple paths to the target fabric-attached I/O device, via the cluster fabric.

25. The method as claimed in claim 23, wherein the multiple paths are utilized for load balancing I/O requests and/or for fault tolerance when one or more paths to the target fabric-attached I/O device fail.

26. A method of initializing a host to report multiple paths via a cluster fabric to a target I/O device that may be shared between the host and another host via the cluster fabric, comprising:

loading a local I/O bus driver and a fabric bus driver providing a local I/O bus abstraction for the cluster fabric into a memory; identifying, using the local I/O bus driver, local I/O controllers connected to a local I/O bus in the host;

identifying, using the fabric bus driver, fabric-attached I/O devices that may be shared between the host and another host via the cluster fabric and that are assigned to the host in order to determine multiple paths to a target fabric-attached I/O device that may be shared between the host and another host via the cluster fabric, and report all multiple paths to the target fabric-attached I/O device via the cluster fabric; and directing service requests between the host and the target fabric-attached I/O controller in response to the multiple paths.

27. The method as claimed in claim 26, wherein the multiple paths are utilized for load balancing I/O requests and/or for fault tolerance when one or more paths to the target fabric-attached I/O device fail.

* * * * *

UNITED STATES PATENT AND TRADEMARK OFFICE
CERTIFICATE OF CORRECTION

| | | |
|---|---|---|
| PATENT NO. | : 7,039,922 B1 | Page 1 of 1 |
| APPLICATION NO. | : 09/450381 | |
| DATED | : May 2, 2006 | |
| INVENTOR(S) | : Shah et al. | |

It is certified that error appears in the above-identified patent and that said Letters Patent is hereby corrected as shown below:

In column 3, line 61, delete "10C" and insert --IOC--.
In column 15, line 10, delete "path" and insert --paths--.
In column 16, line 66, between "computer" and "program" insert --readable--.

Signed and Sealed this

Fourteenth Day of November, 2006

JON W. DUDAS
*Director of the United States Patent and Trademark Office*